June 5, 1956  H. S. JANDUS  2,749,170
AUTOMOBILE BUMPER ATTACHMENT
Filed Dec. 12, 1950  3 Sheets-Sheet 3

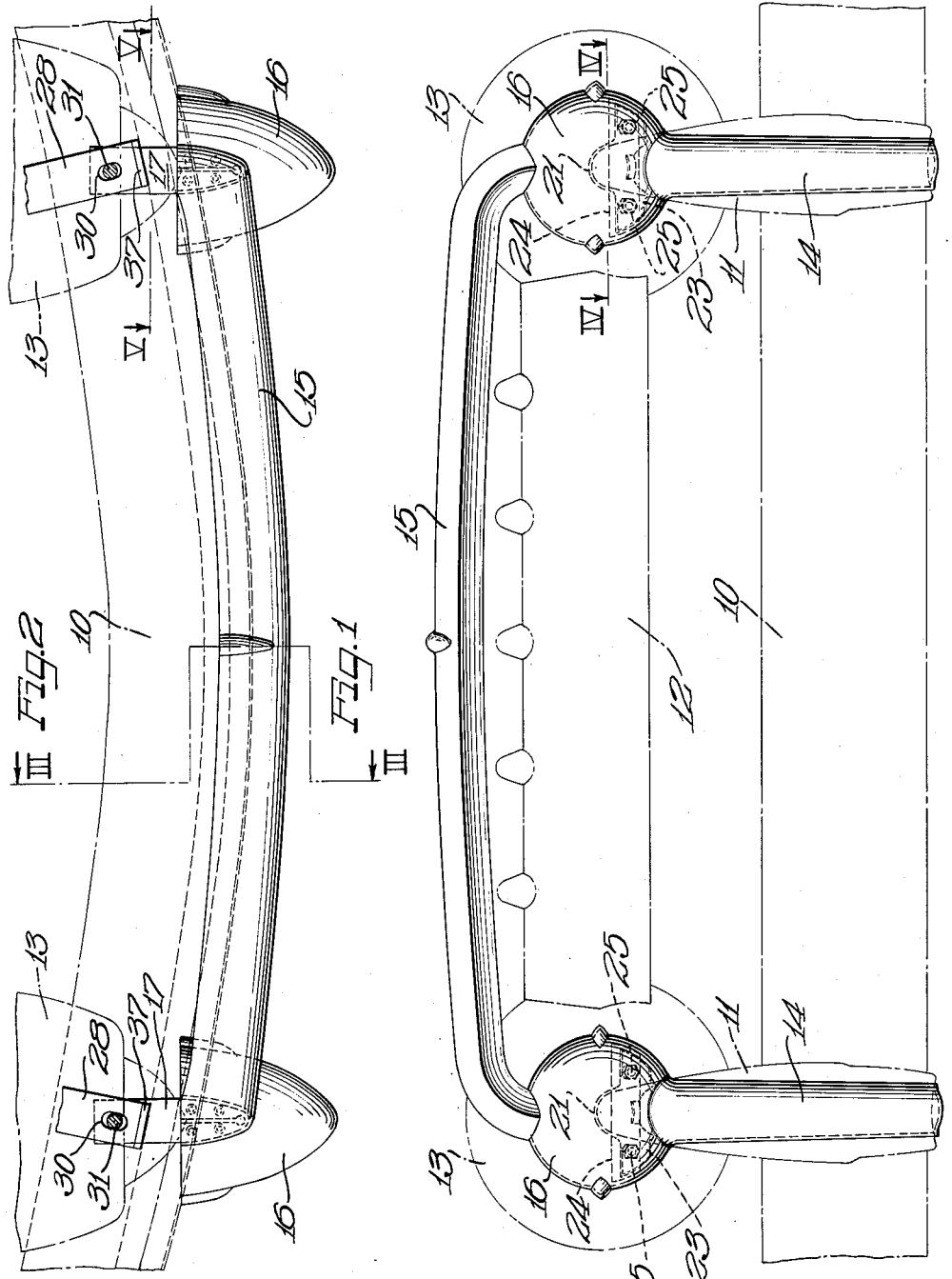

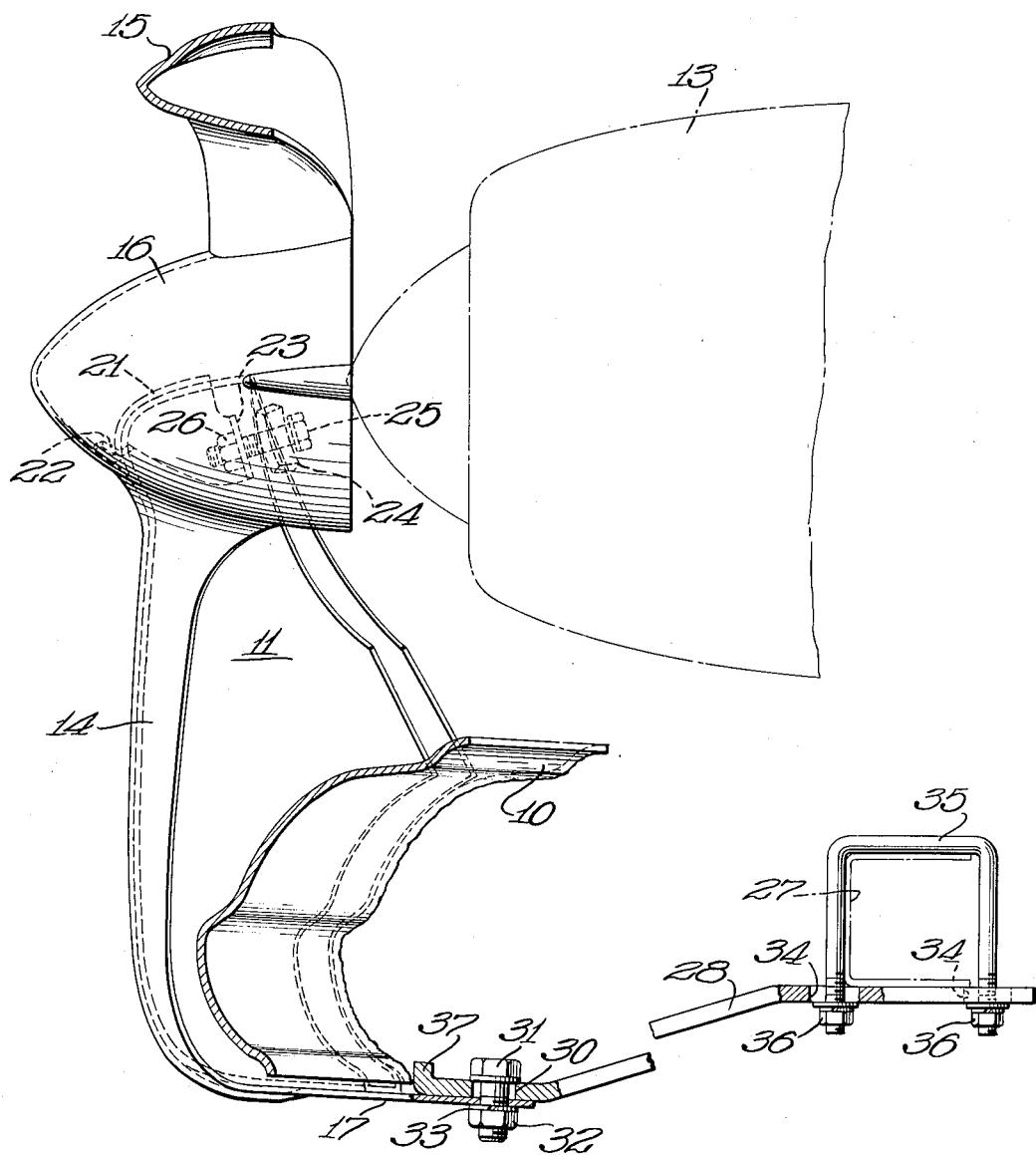

Inventor:
Herbert S. Jandus
by [signature] Attys

United States Patent Office 2,749,170
Patented June 5, 1956

2,749,170

AUTOMOBILE BUMPER ATTACHMENT

Herbert S. Jandus, Detroit, Mich., assignor to Houdaille Industries, Inc., a corporation of Michigan Application December 12, 1950, Serial No. 200,439

6 Claims. (Cl. 293—64)

This invention relates to an attachment for automobile bumpers and more particularly to an attachment for providing added protection to front or rear portions of an automobile.

Conventional automobile bumpers which only have a pair or more of guards upstanding therefrom do not provide adequate protection for the front and rear portions of the automobile. In particular, the guards on the conventional bumper do not extend high enough to protect the grille-work on the front of an automobile or the trunk, etc. on the rear of an automobile in the event of collision with other vehicles having higher projecting portions.

It is, therefore, one object of the present invention to provide an improved attachment for automobile bumpers which will give added protection to the front and rear portions of the automobile.

Another object of the present invention is to provide an automobile bumper attachment having improved means whereby the attachment can be readily secured in place on the conventional bumper guards.

A further object of this invention is to provide improved means for attaching a grille guard bumper attachment to an automobile so that the structure will withstand severe impact.

Still another object of this invention resides in the provision of improved clamp means for securing a body member of a bumper guard attachment to a bumper guard.

Yet another object is to provide an improved connector for securing a body member of a bumper attachment to a transverse frame member of an automobile.

A still further object is to provide an improved structure for securing together the components of a grille guard-type of bumper attachment.

Other objects, features and advantages of the present invention will become more fully apparent from the following detailed description of a preferred embodiment of the invention taken in conjunction with the accompanying drawings, in which:

Figure 1 is an elevational view of an automobile bumper attachment constructed in accordance with the principles of the present invention;

Figure 2 is a top plan view of the automobile bumper attachment of Figure 1;

Figure 3 is a sectional view, on an enlarged scale, taken substantially along line III—III of Figure 2;

As shown on the drawings:

Figure 4:
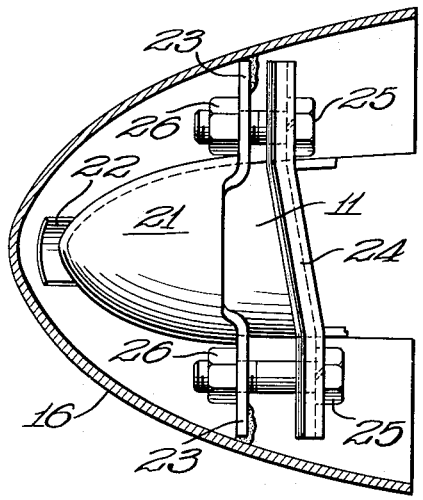
Figure 4 is a sectional view, on an enlarged scale, taken substantially along line IV—IV of Figure 1.
Figure 5:
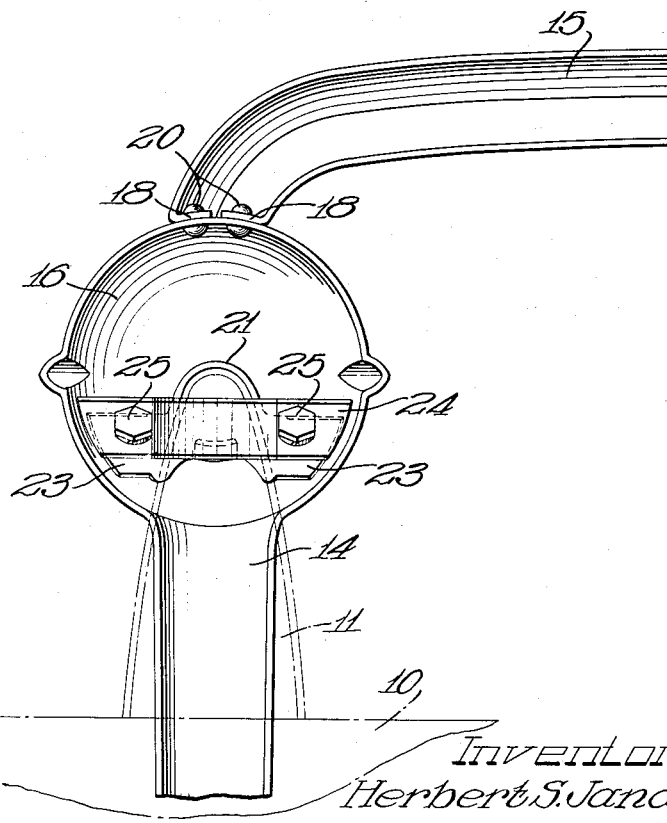
Figure 5 is a rear elevational view, on an enlarged scale, of a portion of the bumper attachment taken substantially in the plane of line V—V of Figure 2.

The bumper attachment of the present invention is adapted to be secured to a bumper of the type having a pair or more of horizontally spaced upstanding bumper guards. Figures 1 and 2 illustrate in phantom or broken lines a bumper having a pair of upstanding guards. Reference numeral 10 designates the bumper; reference numeral 11 designates the guards; and reference numerals 12 and 13 designate portions of the grille-work for which protection is desired. It may be noted that the guards illustrated project outwardly from the bumper, as well as upwardly.

A bumper attachment constructed in accordance with the principles of the present invention includes a pair of vertically elongated, generally channel-shaped body members 14 for disposition in front of the bumper guards 11 and a transverse connecting impact member 15 secured at each end to the upper end of one of the body members 14.

Each body member 14 is formed, at its upper end, with a generally cupped, bullet-shaped, streamlined upper head portion 16 and, at its lower end, with a flanged portion 17 for extension inwardly below the lower edge of the bumper 10. The body members 14 may be fabricated in any desired manner, but preferably are stamped from sheet metal.

The transverse connecting and impact member 15 may be of generally V-shaped cross-section pointing forwardly in a streamlined manner. The main portion of the impact member 15 is disposed above the upper end of the body member 14 and the member is downwardly curved at each end for engagement with the head portion 16 of the body member 14. It is desirable that the impact member 15 be securely fastened to the upper head portions 16. To this end, each end of the impact member 15 has a pair of inwardly turned flanges 18 formed complementary to the surface of the bullet-shaped head portion 16. A pair of rivets 20 extend through each of the flanges 18 and the head portion 16 to securely fasten the impact bar to the body member.

Means are provided for securing each body member 14 to the associated bumper guard 11. To this end, a hood or cap member 21 of complementary shape and arranged to engage snugly upon the top and front of the associated bumper guard may be secured within the top head portion 16 of each body member. Each cap member 21 may have an end flange 22 arranged to snugly engage the inner surface of the head portion 16 near the outer end thereof and a pair of horizontally aligned out-turned side flanges 23 having ends arranged to be disposed adjacent the inner surface of the top head portion 16 near the inner end thereof. The flanges 22 and 23 may be fixed to the end portion 16 by any desired means and are preferably welded thereto.

To secure each cap member 21 onto the associated bumper guard, a clamp bar 24 is adapted to be horizontally disposed across the inside of each bumper guard 11 adjacent the upper end thereof in alignment with the side flanges 23 of the associated cap member. A bolt 25 may extend through each end of the clamp bar 24 and through the associated side flange 23 of the cap member and a nut 26 may be threaded on the end of each bolt on the outer side of the side flange so that each clamp bar can be forced toward the associated cap member to rigidly secure each body member to the associated bar. If desired, each nut 26 may be affixed to the associated flange as by welding so that the bolts can be readily threaded into the nut and tightened.

For the purpose of clarity, the bumper 10 and one guard 11 are illustrated in full lines in Figure 3. Referring thereto, it will be seen that the cap member 21, the body member 14 and the flange 17 are so formed and are so related to the bumper guard that they fit snugly in complementary relation thereto.

A transverse frame member 27 of the automobile is illustrated in phantom or broken lines in Figure 3. Means are provided for securing the inwardly extending flange 17 at the lower end of each body member to the transverse frame member 27. For this purpose, a connector bar 28 is secured at one end to the flange 17 and at the other end to the frame member 27. The connector bar 28 has a longitudinal slot 30 therein adjacent one end. A bolt 31 extends through the slot 30 and through the lower terminal flange 17, a nut 32 being threaded on the bolt 31 to lock the connector bar on the flange portion. If desired, lock washers 33 may be provided to prevent rotation and loosening of the bolts and nuts.

The connector bar 28 has a pair of longitudinally spaced longitudinal slots 34 adjacent the other end. A U-bolt 35 may be disposed over the frame member with the legs of the U-bolt extending through the slots 34, the nuts 36 being threaded onto the ends of the legs to secure the connector 28 to the frame member 27.

The outer end of the connector bar has an upstanding flange 37 at the outer end thereof for engaging the inside of the bumper 10 adjacent the lower end thereof.

To fasten the attachment on an automobile the body members 14 are disposed on the upstanding bumper guards 11 and the clamp bars 24 are attached by means of bolts 25 and nut 26. If desired, as a preliminary, the clamp bars 24 may be loosely attached before disposing the body members on the upstanding guard. The connector bars 28 are attached to the transverse frame member 27 by means of U-bolts 35 and nuts 36 with the outer upstanding flanges 37 at the outer end of the connectors in positive engagement with the lower inside edge of the bumper edge, the legs of U-bolts 35 being adjustable in slots 34 to obtain such positive engagement. The lower inwardly extending flanges 17 of the body members 14 may then be secured to the connectors 28 by means of bolts 31 and nuts 32, the bolts preferably being located centrally of the slots 30. The bolts 25 and the nuts 26 may then be tightened to draw the body members inwardly and upwardly into snug engagement with the bumper guards. This drawing up will prevent rattles from developing between the body members and the bumper and guards.

It will be seen that impacts directed inwardly to the transverse impact member 15 will tend to cant the attachment about the upper end of the guards, but will be prevented from doing so by connector bars 28 and particularly by the engagement of the upstanding flanges 37 thereon with the lower inside edge of the bumper. The slots 30 and 34 in the connector bars permit the bar to be adjustably secured in position and, at the same time, permit relative movement of bolts 31 and 34 relative to the bars 28 in case of severe impacts on the attachment.

It will be seen that the bumper attachment of the present invention can be readily constructed, may be easily attached to an automobile, will withstand severe impact, and will give long service.

It will be understood that modifications and variations may be effected without departing from the scope of the novel concepts of the present invention.

I claim as my invention:

1. An attachment for an automobile having a bumper provided with a guard projecting upwardly therefrom, a vertically elongated body member of generally channel shape for engaging the front of the guard, a generally cupped portion at the upper end of said body member, and a cap member secured within said cupped portion for snugly engaging the top and front of the crown of the guard.

2. An attachment for an automobile having a bumper provided with a guard projecting upwardly therefrom, a body member for disposition in front of the guard, a generally cupped portion at the upper end of said body member, a cap member disposed within said cupped portion for snugly engaging the top and front of the crown of the guard, a pair of outturned aligned flanges on said cap member adjacent the inner end thereof, and means securing the end of each of said flanges to an inside surface portion of said cupped portion.

3. An attachment for an automobile having a bumper provided with a guard upstanding therefrom, comprising a body member for disposition in front of the guard, a generally cupped portion at the upper end of said body member, a cap member disposed within said cupped portion for snugly engaging the top and front of the crown of the guard, a pair of out-turned aligned flanges on said cap member adjacent the inner end thereof, means securing the end of each of said flanges to an inside surface portion of said cup portion, a horizontally extending clamp bar disposed inwardly from said flanges for engaging the inside of the guard adjacent the upper end thereof, and a bolt securing each end of said clamp bar to one of said flanges.

4. An attachment for an automobile having a bumper provided with a guard upstanding therefrom, comprising a body member for disposition in front of said guard, clamp means for securing said body member to said upstanding guard, and means for connecting said body member to a transverse automobile frame member, said clamp means comprising a clamp bar for disposition on the inner side of said guard and a pair of bolts for extension on either side of said guard connecting said clamp bar to said body portion.

5. An attachment for an automobile having a bumper provided with a guard upstanding therefrom, comprising in combination a body member for disposition in front of the guard, a clamp bar for disposition inside the guard, a pair of bolts for disposition on either side of the guard connecting said clamp bar to said body member, said body member having a portion adapted to extend inwardly below the bumper, a connector, means for securing one end of said connector to said portion, means for securing the other end of said connector to a transverse frame member of the automobile, and an upstanding flange on said one end of said connector for engaging the lower inside edge of the bumper.

6. An attachment for an automobile having a bumper provided with a guard upstanding therefrom, comprising: a body member for disposition in front of the guard and arranged to be secured to an upper end portion thereof, a flange on said body member for extending inwardly below the bumper, a connector bar for attaching said flange to a transverse frame member of the automobile and having longitudinally extending slots adjacent opposite ends thereof, means including a first bolt extending through one of said slots for adjustably securing one end of said connector bar to the transverse frame member with the opposite end of the bar in engagement with the lower inside edge portion of the bumper, and a second bolt extending through said flange and the slot adjacent said opposite end of said bar to secure the body member tightly against the guard, said bolts being slidable in said slots in the event of severe impacts on the attachment and bumper.

References Cited in the file of this patent

UNITED STATES PATENTS

| | | |
|---|---|---|
| D. 158,802 | Rubel | May 30, 1950 |
| D. 159,392 | Poncher et al. | July 18, 1950 |
| 2,229,491 | Brooke | Jan. 24, 1941 |
| 2,281,215 | Van Auken | Apr. 28, 1942 |
| 2,342,907 | Stall | Feb. 29, 1944 |
| 2,580,775 | Helms et al. | Jan. 1, 1952 |
| 2,621,955 | Dykstra | Dec. 16, 1952 |
| 2,650,849 | Poncher et al. | Sept. 1, 1953 |